(12) United States Patent
Schmitt

(10) Patent No.: US 6,710,552 B2
(45) Date of Patent: Mar. 23, 2004

(54) CIRCUIT ARRANGEMENT FOR OPERATING DISCHARGE LAMPS

(75) Inventor: Harald Schmitt, Munich (DE)

(73) Assignee: Patent-Treuhand-Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/428,857

(22) Filed: May 5, 2003

(65) Prior Publication Data

US 2003/0209998 A1 Nov. 13, 2003

(30) Foreign Application Priority Data

May 7, 2002 (DE) .......................................... 102 20 471

(51) Int. Cl.[7] .............................................. H05B 37/00
(52) U.S. Cl. ........................ 315/224; 315/225; 315/247
(58) Field of Search ................................. 315/224, 247, 315/225, DIG. 7

(56) References Cited

U.S. PATENT DOCUMENTS

| 5,122,712 | A | * | 6/1992 | Hirschmann ................. 315/106 |
| 5,396,153 | A | | 3/1995 | Shackle |
| 5,828,188 | A | * | 10/1998 | Lecheler ..................... 315/309 |
| 5,986,408 | A | | 11/1999 | Langeslag et al. |

FOREIGN PATENT DOCUMENTS

| FR | 2696291 A | 4/1994 |
| FR | 2696311 A | 4/1994 |

* cited by examiner

*Primary Examiner*—David Vu

(57) ABSTRACT

In the case of circuit arrangements for operating gas-discharge lamps (Lp), a charge pump (D5, D6, C31, C32) is often used for the purposes of power-factor correction. If this is the case, poorly igniting lamps (Lp) experience an increase in voltage across a storage capacitor (C1). This is avoided according to the invention by a PTC (KL) in parallel with diodes (D5, D6) of the charge pump.

9 Claims, 3 Drawing Sheets

CIRCUIT ARRANGEMENT FOR OPERATING DISCHARGE LAMPS

TECHNICAL FIELD

The invention is based on a circuit arrangement which may be used in an operating device for gas-discharge lamps, in which the invention overcomes disadvantages when igniting gas-discharge lamps which are involved when using a charge pump for improving the power factor.

BACKGROUND ART

Circuit arrangements for gas-discharge lamps, referred to below for short as lamps, which are operated at a mains voltage which has, for example, an r.m.s. voltage value of 230 V and a frequency of 50 Hz, generally contain a rectifier and an inverter. Circuit arrangements of this type are subject to relevant standards with regard to the line current harmonics and thus the power factor (e.g. IEC 1000-3-2), and this demands additional outlay on circuitry. A possible cost-effective way of complying with these standards is via circuit topologies termed charge pumps in the literature. An extensive description of the mode of operation and of exemplary embodiments can be found, for example, in the following literature: Qian J., Lee F. C.: *Charge Pump Power-Factor-Correction Technologies, Part I: Concept and Principle, Part II: Ballast Applications*, IEEE Transactions on Power Electronics, Vol. 15, No. 1, pp 121–139, New York, U.S.A., 2000. The principle of a charge pump is for power to be drawn from the mains voltage during a first half-period of a radio-frequency oscillation which is substantially higher than the mains frequency, to be temporarily stored in a pump element and to be supplied, during a second half-period, to a storage capacitor. It is thus possible to achieve an almost sinusoidal characteristic for the line current and thus to reach values for the line current harmonics and the power factor as required by the standards.

As long as the charge pump is in operation it continually supplies power to the storage capacitor. This power is tapped by the lamp in normal operation, i.e. while the lamp is on. A state of equilibrium is formed which is expressed as a constant mean voltage value across the storage capacitor which is to be formed over half a mains period. When the lamp is ignited, a high voltage is required across the lamp but the lamp does not consume any power in this state. Since the charge pump continually supplies power to the storage capacitor, the voltage across the storage capacitor increases when the lamp is ignited. Components used in the circuit arrangement may therefore reach their load limit. In particular, components such as the storage capacitor itself and electronic switches used in the circuit arrangement are designed to have as low a maximum voltage load as possible, for reasons of cost. In the case of a lamp with only delayed ignition or which does not ignite at all, there is therefore the risk of destroying the circuit arrangement since the voltage across the storage capacitor exceeds the maximum permissible voltage of components. This risk is increased in the case of circuit arrangements which do not preheat the electrode filaments of the lamp. By preheating the electrode filaments, the voltage across the lamp which is required for ignition is reduced and thus the ignition process is shortened. In the case of circuit arrangements which do not preheat the electrode filaments, the ignition process is longer and thus the voltage which builds up across the storage capacitor during ignition is higher. Devices which contain such circuit arrangements are also referred to as cold-start devices. Easily igniting lamps are lamps which have an ignition process which is complete after 1 ms. Poorly igniting lamps sometimes require up to 100 ms for ignition.

In order to protect a circuit arrangement having a charge pump against destruction due to a lamp which does not ignite or a poorly igniting lamp, it is usual to provide the circuit arrangement with a shut-off means. The shut-off means generally monitors the voltage across the storage capacitor. When the value of the voltage across the storage capacitor exceeds a predetermined shut-off value, the circuit arrangement is switched off. There is the problem, however, that, in particular in the case of cold-start devices, operation of lamps having a longer ignition process is not ensured.

As a solution to this problem, a pump control switch has been proposed in the prior art via which, in the closed, i.e. low-resistance, state, a pump suppression current flows. The pump control switch is designed in the prior art as an electronic switch, for example as a MOSFET. The pump suppression current essentially causes the pump element not only to supply power to the storage capacitor but also to be capable of drawing power, and thus the operability of the charge pump is limited or the charge pump is switched off completely. The charge pump generally contains the series circuit of a first and a second pump diode. This series circuit is connected between the mains voltage and the storage capacitor. The radio-frequency oscillation is applied to the connection point of the pump diode via the pump element. The pump control switch is connected in parallel with the series circuit of the pump diodes.

It is also possible, in principle, to suppress the operability of the charge pump by arranging a switch in series or in parallel with the pump element. However, since a pump element generally has other effects and functions in the circuit arrangement other than its function in the charge pump, use is in practice not made of this option.

It is also possible for the charge pump to contain not only a series circuit of pump diodes but a plurality of parallel-connected series circuits of pump diodes, a radio-frequency oscillation being applied to each of the connection points of said pump diodes via various pump elements. In this case, the charge pump consists of a plurality of so-called pump paths. All of the pump paths are affected in the same way by the pump control switch.

In the publication U.S. Pat. No. 5,396,153 (Shackle), the pump control switch is controlled by a control device which monitors the value of the voltage across the storage capacitor. The control device compares the value of the voltage across the storage capacitor with a predetermined threshold and turns the pump control switch on when the threshold is exceeded, as a result of which the charge pump is switched off.

In the publication U.S. Pat. No. 5,986,408 (Langeslag), the pump control switch is controlled by a control device which monitors the ignition of the lamp. As long as the lamp has not been ignited, the pump control switch is closed and the charge pump is thus switched off.

In both publications from the prior art, in addition to the pump control switch, outlay must be made on its control means.

DISCLOSURE OF THE INVENTION

It is an object of the present invention to provide a circuit arrangement in accordance with the precharacterizing clause of claim 1 which prevents, with little outlay, the value of the voltage across the storage capacitor from rising during ignition.

This object is achieved by means of a circuit arrangement having the features of the precharacterizing clause of claim 1, by means of the features of the characterizing part of claim 1. Particularly advantageous refinements can be found in the dependent claims.

According to the invention, the pump control switch is not an electronic switch having a control input which must be operated by a control device. Instead, the pump control switch according to the invention is a component which is heated during a heating period by the pump suppression current. When the pump control switch according to the invention reaches a predetermined switching temperature, its resistance increases, as a result of which the pump suppression current is reduced and thus the charge pump becomes active. The pump control switch according to the invention advantageously does not require a control device, as is the case in the prior art. It automatically suppresses the operability of the charge pump during its heating process and prevents the value of the voltage across the storage capacitor from rising over this period. The heating period is such that even a poorly igniting lamp may reliably be ignited. If the lamp has not been ignited after the heating period, either the lamp is defective or some other fault has occurred and the circuit arrangement must be switched off. This may be achieved by a shut-off device which monitors the value of the voltage across the storage capacitor. It is crucial that this shut-off device does not have the function of controlling the charge pump but intervenes only in the event of a fault. The pump control switch according to the invention does not require a control device for its control and therefore offers a cost-effective option even for igniting poorly igniting lamps having circuit arrangements containing a charge pump.

So-called positive temperature coefficient thermistors, which are also referred to as PTCs in the literature, are preferably used for the pump control switch according to the invention. In the start-up period of the circuit arrangement the PTC has a temperature at which it has a resistance which is so low in value that an effective pump suppression current can flow. This pump suppression current heats up the PTC. PTCs intrinsically have a nonlinear correlation between temperature and resistance. There is accordingly an above-described switching temperature. When the PTC reaches this switching temperature, its resistance increases to values which no longer permit any effective pump suppression current to flow and thus the charge pump can operate as intended. According to the invention, the power loss in the PTC, the switching temperature and the thermal inertia of the PTC are matched to one another such that the switching temperature is reached after a period which is sufficient to ignite a poorly igniting lamp.

It is also possible, in principle, for a negative temperature coefficient thermistor (NTC) to be used to control the charge pump, for example connected in series with the pump element. However, this leads, on the one hand, to the disadvantages already outlined above and, on the other hand, to the nonlinearity of NTCs not being pronounced enough for a clear switching temperature to be formed. The mode of operation of the charge pump can therefore not be reliably reproduced.

The pump control switch according to the invention is preferably connected in parallel with the series circuit of the pump diodes. In order to rectify the mains voltage, a generic circuit arrangement has a rectifier which generally comprises rectifier diodes arranged in a bridge circuit. It is known from the literature that the function of the pump diode facing the mains voltage can also be taken over by rectifier diodes. Of the pump diodes connected in series it is now only the pump diode facing the storage capacitor which is still accessible in this case. The pump control switch according to the invention is in this case connected in parallel with this pump diode. In the case of charge pumps having a plurality of pump paths, it may be desirable to influence only one pump path by means of the pump control switch. This is advantageous, for example, if, in order to ignite the lamp, a voltage is required which is higher than the peak value of the mains voltage. In order to effectively reduce the mode of operation of a pump path, the pump control switch according to the invention is connected in parallel with that pump diode which is associated with the relevant pump path and which faces the storage capacitor.

BRIEF DESCRIPTION OF THE DRAWINGS

The invention shall be explained in more detail below by means of exemplary embodiments with reference to drawings, in which.

In the text below, transistors are designated by the letter T, diodes by the letter D, capacitors by the letter C, inductors by the letter L, potentials by the letter P, in each case followed by a number. Also in the text below, identical elements and functionally identical elements in the various exemplary embodiments are given the same reference symbols throughout.

BEST MODE FOR CARRYING OUT THE INVENTION

Figure 1:
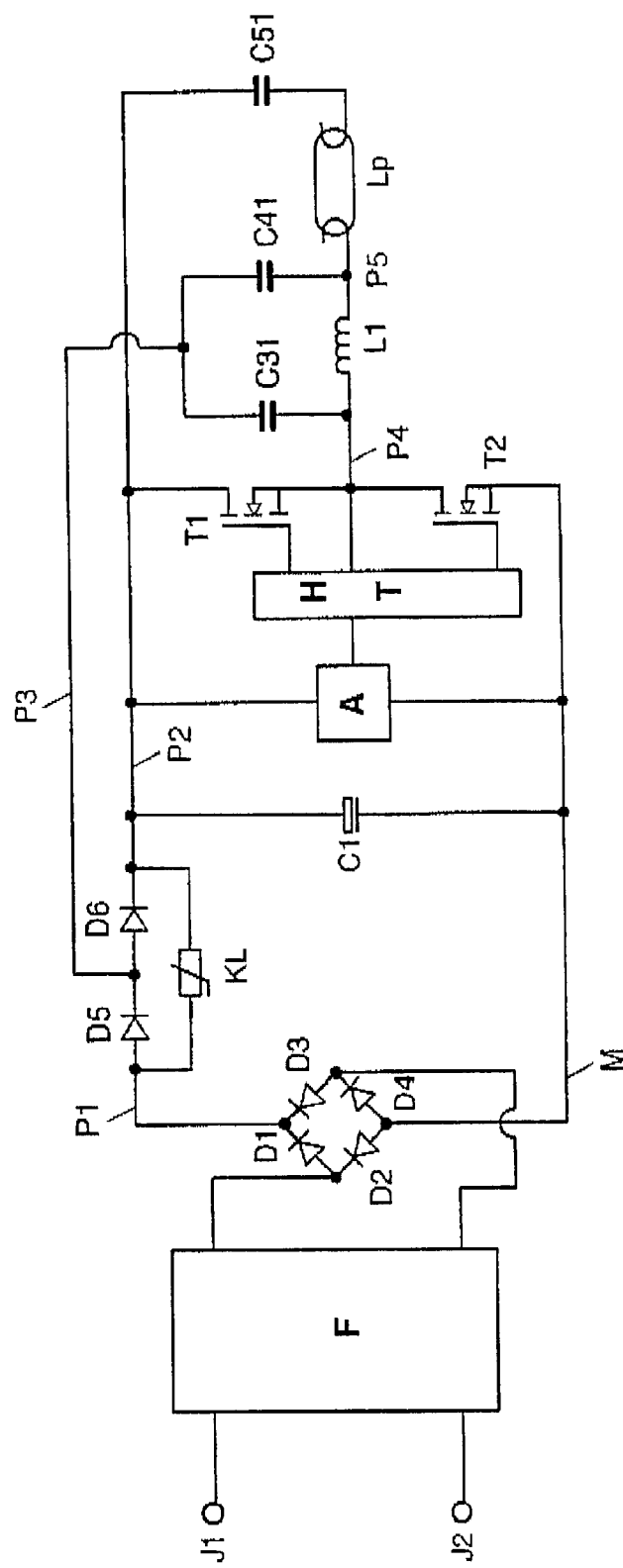
FIG. 1 shows an exemplary embodiment of a circuit arrangement according to the invention.

FIG. 1 shows a circuit arrangement according to the invention. Connection to a mains voltage is provided at the input terminals J1 and J2, and this mains voltage is supplied to a filter device F. The filter device F serves to suppress radio interference. The output of the filter device F is connected to a rectifier comprising the diodes D1, D2, D3 and D4. The diodes D1–D4 are connected in a known bridge rectifier circuit. The positive potential of the rectified mains voltage is provided, via the diodes D1 and D3, at a potential P1. A ground potential M is connected to the diodes D2 and D4. The series circuit of a first pump diode D5 and a second pump diode D6 is connected between P1 and a potential P2. The polarity of the pump diodes is selected such that the mains voltage in the circuit arrangement can generate a current flow. A storage capacitor C1 is connected between the potential P2 and the ground potential M.

The voltage across C1 is supplied to an inverter which is described below. The series circuit of a first and a second semiconductor switch T1 and T2, which form a so-called half-bridge, is connected between P2 and the ground potential M. The potential P4 is formed at the connection point of the semiconductor switches. The semiconductor switches are designed in this example as MOSFETs. However, they may also be designed as bipolar transistors or IGBTs, for example. T1 and T2 are driven alternately at the gates by a half-bridge driver HT. A drive circuit A predetermines the clock for this drive. Said drive circuit A can generate its clock independently of or as a function of output variables of the half-bridge. In the latter case, the device is known as a self-excited half-bridge inverter. The mode of operation of such an inverter is explained, for example, in the publication EP 781 077 (Schmitt). A lamp inductor L1 is connected between the potential P4 and a potential P5. The series circuit of a lamp Lp and a coupling capacitor C51 is connected between PS and P2. The radio-frequency oscillations at P4 and PS are fed via the capacitors C31 and C41 to the connection point of the pump diodes D5 and D6 where the potential P3 is formed. In the present case, C31 and C41 form the pump elements.

The PTC KL is connected, according to the invention, in parallel with the series circuit of the pump diodes D5 and D6. As long as said PTC KL is cold, a pump suppression current flows from P2 via the PTC KL and via D5 given a low potential at P3. By this means, the mode of operation of the charge pump comprising the elements D5, D6, C31 and C41 is effectively reduced and the voltage across the storage capacitor during the ignition process is prevented from rising constantly. The PTC KL is heated by the pump suppression current. When it reaches a switching temperature, its resistance increases considerably. The current which flows via the PTC given a low potential at P3 is then negligible in comparison with the current which is taken from the mains voltage. The mode of operation of the charge pump is no longer effectively adversely affected. In the exemplary embodiment in FIG. 1, the radio-frequency oscillation at P4 and at P5 is used for the charge pump. It is also possible for only one of the two radio-frequency oscillations to be used. The capacitor which is connected to the unused radio-frequency oscillation may then be connected to P2.

A further possible variant is one in which the pump diodes D5 and D6 are not looped into the positive output of the rectifier but into the negative one. In this case the ground potential M is connected to the negative output of the rectifier, i.e. the connection point of the diodes D2 and D4, via the series circuit of the pump diodes.

Figure 2:
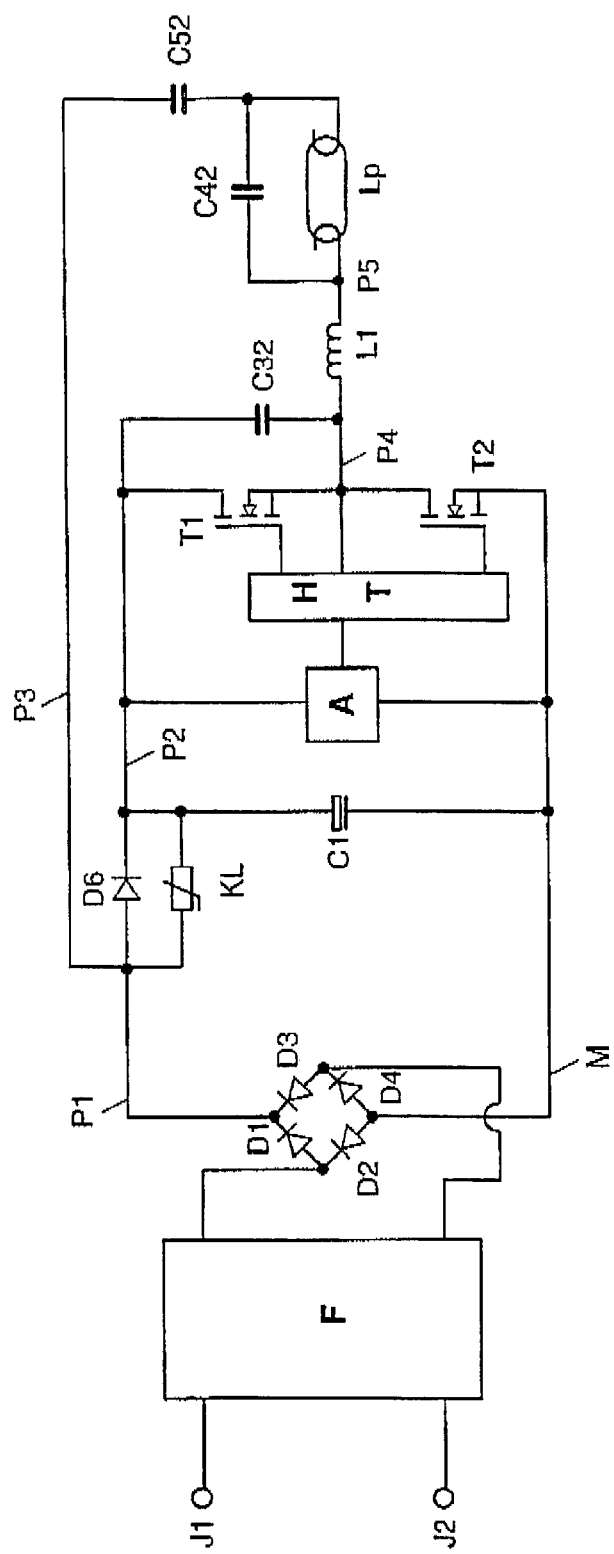
FIG. 2 shows a further exemplary embodiment of a circuit arrangement according to the invention.

FIG. 2 shows a further example of a circuit arrangement according to the invention. Two changes as compared with the exemplary embodiment in FIG. 1 should be recorded:

1. The potential at P4 and P5 is no longer used as the radio-frequency oscillation for the charge pump. Instead, the radio-frequency oscillation of the current through the coupling capacitor C52 is used for the charge pump. C52 is accordingly no longer connected to P2 but to the anode of D6. C52 now functions as a pump element. C32 is connected to P2 and C42 is connected in parallel with the lamp Lp.

2. The pump diode D5 in the exemplary embodiment in FIG. 1 is dispensed with. Its function is taken over by the rectifier diodes D1 and D3. The potential P1 is therefore the same as the potential P3. According to the invention, the PTC KL is connected in parallel with the pump diode D6. Its mode of operation is analogue to that in the exemplary embodiment in FIG. 1.

The two changes made to FIG. 1 and FIG. 2 are not linked, but may be undertaken independently of one another. This is also true for all of the variations of the charge pump known from the literature.

Figure 3:
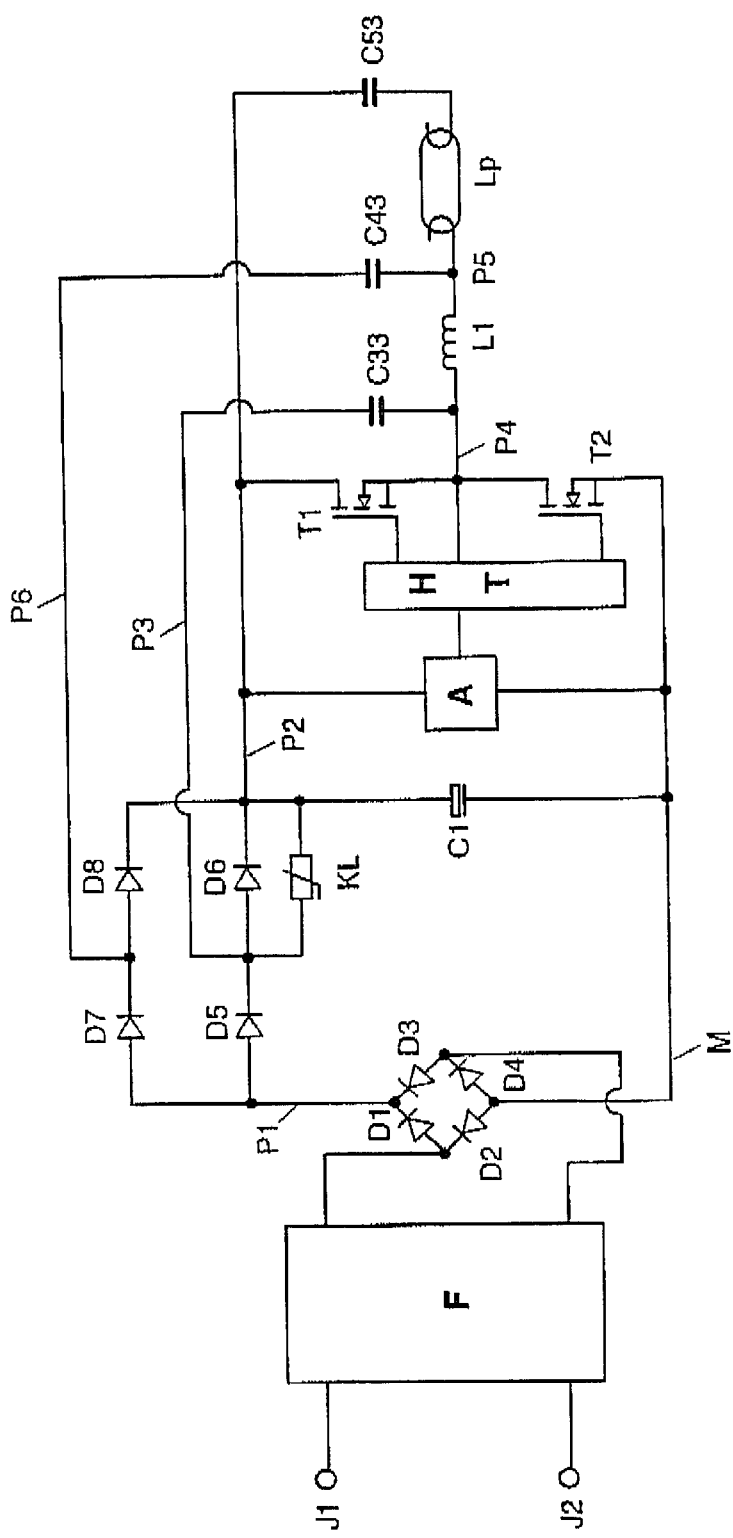
FIG. 3 shows a further exemplary embodiment of a circuit arrangement according to the invention.

FIG. 3 shows a further exemplary embodiment of a circuit arrangement according to the invention. As compared with the exemplary embodiment in FIG. 1 the circuit arrangement now has two pump paths. A further series circuit of the pump diodes D7 and D8 is connected in parallel with the pump diodes D5 and D6. By comparison with FIG. 1 the capacitors C33 and C43 are not connected at one end. Only the capacitor C33 is still connected to the potential P3. In the second pump path the radio-frequency oscillation of the potential P5 is fed via the capacitor C43 to the potential P6 which represents the connection point of the pump diodes D7 and D8 of the second pump path.

According to the invention, the PTC KL is connected only in parallel with the pump diode D6 of the first pump path. Thus, it is deliberately only the first charge pump which is influenced. The second charge pump is active even during ignition. This can be desirable in order to attain a higher voltage across the storage capacitor C1 during the ignition process and thus to increase the ignition voltage.

It is also possible to connect the PTC KL in parallel with the pump diode D8. In this case, the second pump path is switched off until the PTC has heated up.

What is claimed is:

1. A circuit arrangement, for operating discharge lamps at a mains voltage, having the following features:
   inverter having a charge pump for improving the power factor,
   a pump control switch which, if it is in a low-resistance state, carries a pump suppression current, as a result of which the mode of operation of the charge pump is effectively reduced,
   characterized in that the resistance value of the pump control switch is temperature-dependent such that the pump control switch is heated by the pump suppression current to a switching temperature at which the resistance of the pump control switch assumes values which reduce the pump suppression current to such an extent that the mode of operation of the charge pump is no longer effectively adversely affected.

2. The circuit arrangement as claimed in claim 1, characterized in that the pump control switch contains a PTC.

3. The circuit arrangement as claimed in claim 1, characterized in that the charge pump contains two series-connected pump diodes and the pump control switch is connected in parallel with the series circuit of the pump diodes.

4. The circuit arrangement as claimed in claim 1, characterized in that the charge pump contains two series-connected pump diodes which are connected between the mains voltage and a storage capacitor and the pump control switch is connected in parallel with the pump diode which is connected to the storage capacitor.

5. The circuit arrangement as claimed in claim 1, characterized in that the charge pump contains a plurality of pump paths with pump diodes of which at least one is connected in parallel with the pump control switch.

6. A method for starting and operating a discharge lamp having a circuit arrangement which contains an inverter having a charge pump for improving the power factor, and a pump control switch, characterized by the following steps:
   the circuit arrangement is connected to a mains voltage,
   a pump suppression current, which effectively adversely affects the mode of operation of the charge pump, flows via the pump control switch,
   the pump suppression current heats the pump control switch,
   the temperature of the pump control switch reaches a switching temperature,
   the resistance value of the pump control switch increases at the switching temperature,
   the pump suppression current is reduced by the increased resistance value of the pump control switch,
   the pump suppression current decreases to a value which no longer effectively adversely affects the mode of operation of the charge pump.

7. The circuit arrangement as claimed in claim 2, characterized in that the charge pump contains two series-connected pump diodes and the pump control switch is connected in parallel with the series circuit of the pump diodes.

8. The circuit arrangement as claimed in claim 2, characterized in that the charge pump contains two series-connected pump diodes which are connected between the mains voltage and a storage capacitor and the pump control switch is connected in parallel with the pump diode which is connected to the storage capacitor.

9. The circuit arrangement as claimed in claim 2, characterized in that the charge pump contains a plurality of pump paths with pump diodes of which at least one is connected in parallel with the pump control switch.

\* \* \* \* \*